United States Patent
Wu

(10) Patent No.: US 10,051,696 B2
(45) Date of Patent: Aug. 14, 2018

(54) SWITCHING POWER SUPPLY DEVICE AND LIGHT ILLUMINATING APPARATUS HAVING THE SAME

(71) Applicant: HOYA CANDEO OPTRONICS CORPORATION, Toda-shi, Saitama (JP)

(72) Inventor: Lisong Wu, Toda (JP)

(73) Assignee: HOYA CANDEO OPTRONICS CORPORATION, Toda-Shi, Saitama (JP)

(*) Notice: Subject to any disclaimer, the term of this patent is extended or adjusted under 35 U.S.C. 154(b) by 0 days.

(21) Appl. No.: 15/261,756

(22) Filed: Sep. 9, 2016

(65) Prior Publication Data

US 2017/0079099 A1    Mar. 16, 2017

(30) Foreign Application Priority Data

Sep. 11, 2015 (JP) .................. 2015-180234

(51) Int. Cl.
*H05B 41/288* (2006.01)
*H02M 3/335* (2006.01)
(Continued)

(52) U.S. Cl.
CPC .... *H05B 33/0815* (2013.01); *H02M 3/33561* (2013.01); *H05B 33/0818* (2013.01);
(Continued)

(58) Field of Classification Search
CPC ....... H02M 1/4258; H02M 2007/4815; H02M 3/33546; H02M 3/3376;
(Continued)

(56) References Cited

U.S. PATENT DOCUMENTS 5,898,581 A    4/1999  Liu
7,102,251 B2   9/2006  West
(Continued)

FOREIGN PATENT DOCUMENTS

CN    101248575 A    8/2008
CN    102801327 A    11/2012
(Continued)

OTHER PUBLICATIONS

Korean Office Action dated Nov. 29, 2017, and its English translation.

*Primary Examiner* — Alexander H Taningco
*Assistant Examiner* — Renan Luque
(74) *Attorney, Agent, or Firm* — Rabin & Berdo, P.C.

(57) ABSTRACT

Provided is a switching power supply device having a very small switching loss, which includes a rectifier circuit for rectifying a commercial AC voltage, a full-bridge circuit having first to fourth switching element, a transformer having a single primary coil and an N number of secondary coils, an N number of rectifying and smoothing circuits, an output detecting circuit for detecting at least one of voltage and current output from each rectifying and smoothing circuit, and a control circuit. Each rectifying and smoothing circuit includes a rectifying unit, a secondary switching element for controlling an output of the rectified voltage, and a smoothing unit for smoothing the rectified voltage, and the control circuit turns on each secondary switching element during a predetermined time.

14 Claims, 5 Drawing Sheets

(51) Int. Cl.
*H02M 1/42* (2007.01)
*H05B 33/08* (2006.01)

(52) U.S. Cl.
CPC ....... *H05B 41/2883* (2013.01); *H02M 1/4225* (2013.01); *H02M 3/33576* (2013.01); *H02M 3/33592* (2013.01); *Y02B 20/348* (2013.01); *Y02B 70/126* (2013.01)

(58) Field of Classification Search
CPC ..... H02M 2001/0058; H02M 3/33576; H02M 3/33592; H02M 3/28; H02M 2001/0012; Y02B 70/126; Y02B 70/1441; Y02B 70/1491
USPC ..... 363/15–20, 34, 108, 125–127, 159, 163, 363/165
See application file for complete search history.

(56) References Cited

U.S. PATENT DOCUMENTS

| | | | | |
|---|---|---|---|---|
| 2002/0126515 A1* | 9/2002 | Boeke | ................... | H02M 3/28 363/34 |
| 2008/0170418 A1* | 7/2008 | Nishiyama | ............ | H02M 3/337 363/17 |
| 2010/0109571 A1* | 5/2010 | Nishino | .............. | H02M 1/4208 315/307 |
| 2012/0300501 A1* | 11/2012 | Kojima | ............ | H02M 3/33576 363/17 |
| 2013/0033904 A1* | 2/2013 | Ye | ..................... | H02M 3/33576 363/17 |
| 2016/0197557 A1* | 7/2016 | Namba | ................... | H02M 1/14 363/21.12 |

FOREIGN PATENT DOCUMENTS

| | | |
|---|---|---|
| CN | 104837236 A | 8/2015 |
| JP | 54-140154 A | 10/1979 |
| JP | 2011-217566 A | 10/2011 |
| JP | 2013-247817 A | 12/2013 |
| JP | 2014-024264 A | 2/2014 |
| JP | 2014-166026 A | 9/2014 |
| JP | 2014-183608 A | 9/2014 |
| JP | 2015-089146 A | 5/2015 |
| JP | 2015-122903 A | 7/2015 |
| TW | 201201492 A | 1/2012 |
| TW | 201403201 A | 1/2014 |

* cited by examiner

SWITCHING POWER SUPPLY DEVICE AND LIGHT ILLUMINATING APPARATUS HAVING THE SAME

TECHNICAL FIELD

The present disclosure relates to a full-bridge switching power supply device, and more particularly, to a switching power supply device having less switching loss and a light illuminating apparatus having the same.

BACKGROUND ART

In an existing technique, an ultraviolet irradiator has been used for curing an ultraviolet-curing resin used as an adhesive around a flat panel display (FPD) or an ultraviolet-curing ink used as an ink for sheet-fed printing.

As the ultraviolet irradiator, a lamp-type irradiator using a high-pressure mercury lamp or a mercury xenon lamp as a light source is known in the art. Recently, an ultraviolet irradiator using a light emitting diode (LED) as a light source instead of an existing discharge lamp is being developed in order to reduce power consumption, extend a life span and allow a compact design (e.g., Patent Literature 1).

An ultraviolet irradiator disclosed in Patent Literature 1 includes a first light irradiating device disposed to face an ultraviolet-curing ink irradiated surface of an irradiation target, and a second light irradiating device disposed to face a non-irradiated surface positioned opposite to the irradiated surface. Here, an ultraviolet ray from the first light irradiating device and an ultraviolet ray from the second light irradiating device are simultaneously irradiated to the irradiation target to enhance adhesion between the irradiation target and the ultraviolet-curing ink.

In order to emit light from the LED, a voltage over an operation voltage VF should be applied and a predetermined current should flow. For this reason, in the ultraviolet irradiator using a LED as a light source, a so-called switching power supply device for converting AC power supplied from an AC power source AC (commercial power) into DC power is used (e.g., Patent Literature 2)

RELATED LITERATURES

Patent Literature

Patent Literature 1: Japanese Unexamined Patent Publication No. 2014-024264
Patent Literature 2: Japanese Unexamined Patent Publication No. 2011-217566

DISCLOSURE

Technical Problem

The switching power supply device disclosed in Patent Literature 2 changes on-duty and switching frequency of a full-bridge switching element to improve a power factor and control an output voltage, and a simple circuit having a reduced number of components is used to lower a switching loss and thus ensure high efficiency.

However, at the timing when switching elements Q1 to Q4 at a primary side turn on/off, a current flows at a secondary coil, and a current also flows at the switching elements Q1 to Q4 at the primary side. Thus, a switching loss is generated at the switching elements Q1 to Q4.

Generally, the switching elements Q1 to Q4 use a high-voltage N-channel MOS-type FET (N-channel Metal-Oxide-Semiconductor Field-Effect Transistor). However, the high-voltage N-channel MOS-type FET is slow, and the voltage at the primary side is set very high, and thus the switching loss at the switching elements Q1 to Q4 is very high.

The present disclosure is designed in consideration of the above, and the present disclosure is directed to providing a full-bridge switching power supply device having a very small switching loss, and a light illuminating apparatus having the same.

Technical Solution

In one general aspect, the present disclosure provides a switching power supply device, comprising: a rectifier circuit configured to rectify a commercial AC voltage to be converted into a DC voltage; a full-bridge circuit including a first arm composed of a first switching element and a second switching element connected in series with respect to the DC voltage and a second arm composed of a third switching element and a fourth switching element connected in series with respect to the DC voltage; a transformer having a single primary coil and an N (N is an integer of 1 or above) number of secondary coils, the primary coil having one end connected to a center point of the first arm, the primary coil having the other end connected to a center point of the second arm; an N number of rectifying and smoothing circuits including a rectifying unit connected to each of the secondary coils to rectify an AC voltage generated at the secondary coil, a secondary switching element configured to control an output of the rectified voltage rectified by the rectifying unit, and a smoothing unit configured to smooth the rectified voltage to generate a DC output voltage and supply power to a load; an output detecting circuit configured to detect at least one of voltage and current output from the smoothing unit of each of the rectifying and smoothing circuits; and a control circuit configured to control the first to fourth switching elements and the secondary switching element to turn on/off on the basis of at least one of the detected voltage and the detected current detected by the output detecting circuit, wherein the control circuit turns on each of the secondary switching elements during a predetermined time so that the voltage or current output from the smoothing unit of each of the rectifying and smoothing circuits becomes a preset target voltage or target current during a period when the first switching element and the fourth switching element are turn on and during a period when the second switching element and the third switching element turn on.

In this configuration, since the secondary switching element is configured to turn on for a predetermined time during a period when the first switching element and the fourth switching element turn on and during a period when the second switching element and the third switching element turn on, a switching loss is not generated when the first to fourth switching elements turn on or off. In addition, a power may be supplied to a plurality of loads by using a single switching power supply device.

In addition, the control circuit may obtain at least one of a voltage difference between the target voltage and the detected voltage and a current difference between the target current and the detected current, and control the first to fourth switching elements and the secondary switching element to turn on/off on the basis of at least one of the voltage difference and the current difference. Also, in this case, the control circuit may determine an on/off timing of the secondary switching element on the basis of at least one of the voltage difference and the current difference, and determine an on/off timing of the first to fourth switching elements on the basis of the on/off timing of the secondary switching element.

In addition, each of the rectifying units may include a first diode having a cathode terminal connected to one end of each of the secondary coils, and a second diode having a cathode terminal connected to the other end of each of the secondary coils, and an anode terminal of the first diode and an anode terminal of the second diode may be connected to a secondary ground.

In addition, each of the rectifying units may include a first MOS-type FET having a drain connected to one end of each of the secondary coils, and a second MOS-type FET having a drain connected to the other end of each of the secondary coils, a source terminal of the first MOS-type FET and a source terminal of the second MOS-type FET may be connected to a secondary ground, a gate terminal of the first MOS-type FET and a gate terminal of the second MOS-type FET may be respectively connected to the control circuit, and the first MOS-type FET and the second MOS-type FET may rectify an AC voltage generated at the secondary coil and serve as the secondary switching element.

In addition, each of the secondary coils may be composed of a first coil and a second coil connected in series, and the rectifying unit may output voltages of center points of the first coil and the second coil as the rectified voltage.

In another aspect of the present disclosure, there is provided a light illuminating apparatus, comprising: a switching power supply device as described above; and an N number of LED modules connected to each of the rectifying and smoothing circuits to emit light.

Advantageous Effects

As described above, according to the present disclosure, it is possible to realize a full-bridge switching power supply device having a very small switching loss, and a light illuminating apparatus having the same.

BEST MODE

Figure 1:
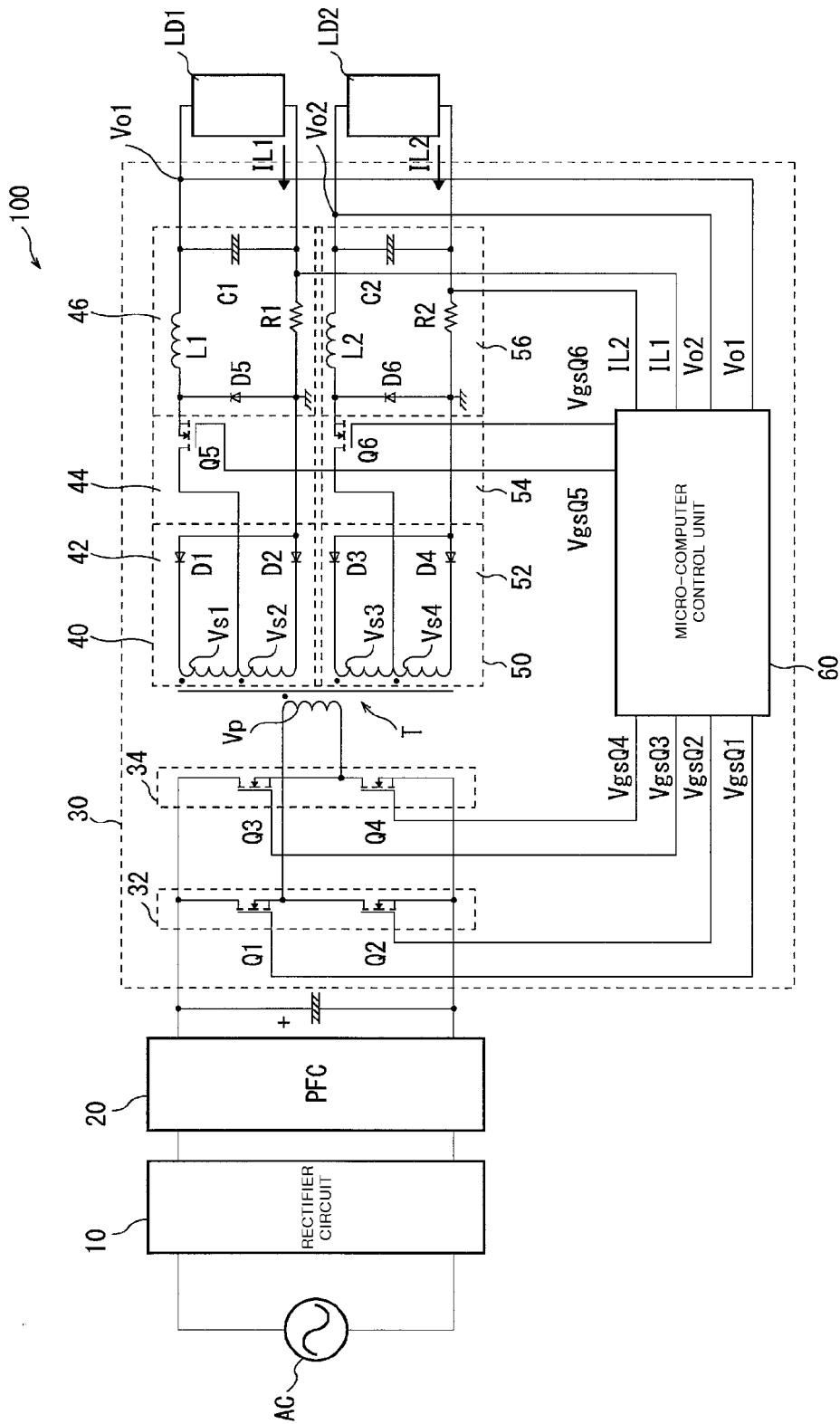
FIG. 1 is a circuit diagram showing a switching power supply device according to the first embodiment of the present disclosure.

Hereinafter, the embodiments of the present disclosure will be described in detail with reference to accompanying drawings. In addition, in the drawings, like reference numerals denote like elements and are not described repeatedly.

First Embodiment

FIG. 1 is a circuit diagram schematically showing a switching power supply device 100 according to the first embodiment of the present disclosure. The switching power supply device 100 of this embodiment is, for example, a device loaded on an ultraviolet irradiator to supply power to a LED module or the like, and converts AC power supplied from an AC power source (commercial power) into DC power and supplies the DC power to loads LD1, LD2 of the LED module or the like.

As shown in FIG. 1, the switching power supply device 100 of this embodiment includes a rectifier circuit 10, a power factor correction (PFC) circuit 20, and a DC-DC converter 30.

The rectifier circuit 10 is composed of, for example, a diode bridge circuit and rectifies AC power supplied from the AC power source.

The PFC circuit 20 improves a power factor of the power rectified by the rectifier circuit 10 and supplies the power to the DC-DC converter 30. The PFC circuit 20 may employ a generally boosting PFC circuit.

The DC-DC converter 30 is a so-called isolated converter in which a circuit at a primary side and a circuit at a secondary side are isolated, and adopts a full-bridge type. The DC-DC converter 30 of this embodiment includes a first arm 32 to which a first switch Q1 and a second switch Q2 are connected in series, a second arm 34 to which a third switch Q3 and a fourth switch Q4 are connected in series, a transformer T, two rectifying and smoothing circuits 40, 50, and a micro-computer control unit 60, and the DC-DC converter 30 is configured to supply different DC powers to the loads LD1, LD2.

The first switch Q1, the second switch Q2, the third switch Q3 and the fourth switch Q4 are a high-voltage N-channel MOS-type FET which configures a full-bridge circuit, and serve as a switching element for switching an input voltage to the DC-DC converter 30. Drain terminals of the first switch Q1 and the third switch Q3 are connected to a high-potential output terminal of the PFC circuit 20, and source terminals of the second switch Q2 and the fourth switch Q4 are connected to a low-potential output terminal of the PFC circuit 20. In addition, a source terminal of the first switch Q1 is connected to the drain terminal of the second switch Q2, and its node is connected to any one terminal of a primary coil Vp of the transformer T. In addition, a source terminal of the third switch Q3 is connected to a drain terminal of the fourth switch Q4, and its node is connected to the other terminal of the primary coil Vp of the transformer T.

The transformer T of this embodiment includes a primary coil Vp, secondary coils Vs1, Vs2 connected to each other in series, and secondary coils Vs3, Vs4 connected to each other in series, and as described above, the primary coil Vp is connected between a center point of the first arm 32 (namely, the first switch Q1 and the second switch Q2) and a center point of the second arm 34 (namely, the third switch Q3 and the fourth switch Q4).

A pulse width modulation (PWM) signal is input to gate terminals of the first switch Q1, the second switch Q2, the third switch Q3 and the fourth switch Q4 from the micro-computer control unit 60 (explained later in detail). In addition, if the first switch Q1 and the fourth switch Q4 turn on and the second switch Q2 and the third switch Q3 turn off, a forward electromotive force is generated at the primary coil Vp of the transformer T, and if the first switch Q1 and the fourth switch Q4 turn off and the second switch Q2 and the third switch Q3 turn on, a backward electromotive force is generated at the primary coil Vp of the transformer T.

The transformer T of this embodiment is a high-frequency transformer having a primary coil Vp, secondary coils Vs1, Vs2 connected to each other in series, and secondary coils Vs3, Vs4 connected to each other in series. The primary coil Vp, the secondary coils Vs1, Vs2 and the secondary coils Vs3, Vs4 are coupled by means of electron induction. Also, as the first switch Q1, the second switch Q2, the third switch Q3 and the fourth switch Q4 turn on/off, an electromotive force according to a turns ratio of the primary coil Vp and the secondary coils Vs1, Vs2 are induced to both ends of the secondary coils Vs1, Vs2, and an electromotive force according to a turns ratio of the primary coil Vp and the secondary coils Vs3, Vs4 is induced to both ends of the secondary coils Vs3, Vs4.

A rectifying and smoothing circuit 40 including a rectifying unit 42 for rectifying an AC voltage generated at the secondary coils Vs1, Vs2, a switching unit 44 for switching a voltage rectified by the rectifying unit 42, and a smoothing unit 46 for smoothing a voltage input from the switching unit 44 is connected to the secondary coils Vs1, Vs2. The rectifying unit 42 is composed of diodes D1, D2, the diode D1 has a cathode terminal connected to a positive electrode of the secondary coil Vs1, the diode D2 has a cathode terminal connected to a negative electrode of the secondary coil Vs2, and both anode terminals of the diode D1 and the diode D2 are connected to a secondary ground (grounded). In this configuration, the rectifying unit 42 rectifies a voltage induced by the secondary coils Vs1, Vs2 to output a rectified voltage (explained later in detail).

The switching unit 44 is composed of a fifth switch Q5 (a secondary switching element) of the N-channel MOS-type FET and is a circuit for switching an input to the smoothing unit 46. The smoothing unit 46 is composed of a diode D5, a smoothing inductor L1 and a smoothing condenser C1, smooths the rectified voltage of the rectifying unit 42 input through the switching unit 44 to output a predetermined output voltage Vo1, and supplies the output voltage Vo1 and the output current IL1 to a load LD1. In addition, the fifth switch Q5 switches a voltage lower than the primary first to fourth switches Q1 to Q4, and thus the fifth switch Q5 may employ a lower-voltage faster switch in comparison to the first to fourth switches Q1 to Q4.

The drain terminal of the fifth switch Q5 is connected to the center points of the secondary coils Vs1, Vs2, and the source terminal is connected to a cathode terminal of the diode D5 and an input terminal of the smoothing inductor L1. In addition, a PWM signal is input from the micro-computer control unit 60 to the gate terminal of the fifth switch Q5, and during the entire period when the secondary coils Vs1, Vs2 generate a voltage, the fifth switch Q5 turns on for a predetermined time. In addition, by adjusting the time when the fifth switch Q5 turns on, the output voltage Vo1 output from the rectifying and smoothing circuit 40 is adjusted (explained later in detail). In addition, a resistor R1 of the rectifying and smoothing circuit 40 is a resistor for detecting a current (or, an output current IL1) flowing on the load LD1, and one end of the resistor R1 at the load LD1 is connected to the micro-computer control unit 60.

A rectifying and smoothing circuit 50 including a rectifying unit 52 for rectifying an AC voltage generated at the secondary coils Vs3, Vs4, a switching unit 54 for switching a voltage rectified by the rectifying unit 52, and a smoothing unit 56 for smoothing a voltage input from the switching unit 54 is connected to the secondary coils Vs3, Vs4. The rectifying unit 52 is composed of diodes D3, D4, the diode D3 has a cathode terminal connected to a positive electrode of the secondary coil Vs3, the diode D4 has a cathode terminal connected to a negative electrode of the secondary coil Vs4, and both anode terminals of the diode D3 and the diode D4 are connected to the secondary ground (grounded). In this configuration, the rectifying unit 52 rectifies a voltage induced to the secondary coils Vs3, Vs4 and outputs a rectified voltage (explained later in detail).

The switching unit 54 is composed of a sixth switch Q6 (a secondary switching element) of the N-channel MOS-type FET and is a circuit for switching an input to the smoothing unit 56. The smoothing unit 56 is composed of a diode D6, a smoothing inductor L2 and a smoothing condenser C2, smooths a rectified voltage of the rectifying unit 52 input through the switching unit 54 to output a predetermined output voltage Vo2, and supplies the output voltage Vo2 and the output current IL2 to the load LD2. In addition, the sixth switch Q6 switches a lower voltage than the first to fourth switches Q1 to Q4 at the primary side, similar to the fifth switch Q5, and thus the sixth switch Q6 may employ a lower-voltage faster switch in comparison to the first to fourth switches Q1 to Q4.

The drain terminal of the sixth switch Q6 is connected to the center point of the secondary coils Vs3, Vs4, and the source terminal is connected to a cathode terminal of the diode D6 and an input terminal of the smoothing inductor L2. In addition, a PWM signal is input to a gate terminal of the sixth switch Q6 from the micro-computer control unit 60, and during the entire period when the secondary coils Vs3, Vs4 generate a voltage, the sixth switch Q6 may turn on for a predetermined time. In addition, by adjusting the time when the sixth switch Q6 turns on, the output voltage Vo2 output from the rectifying and smoothing circuit 50 may be adjusted (explained later in detail). In addition, a resistor R2 of the rectifying and smoothing circuit 50 is a resistor for detecting a current (or, an output current 1L2) flowing on the load LD2, and one end of the resistor R2 at the load LD2 is connected to the micro-computer control unit 60.

The micro-computer control unit 60 is a so-called central processing unit (CPU) circuit operating by a program stored therein, and, as shown in FIG. 1, the micro-computer control unit 60 is connected to the output voltages Vo1, Vo2, one end of the resistor R1 at the load LD1, one end of the resistor R2 at the load LD2, and the gate terminals of the first to sixth switches Q1 to Q6. The micro-computer control unit 60 include an analog-to-digital (AD) converter therein, and by using the AD converter, the micro-computer control unit 60 detects the output voltage Vo1 and the output current IL1 of the rectifying and smoothing circuit 40 and the output voltage Vo2 and the output current 1L2 of the rectifying and smoothing circuit 50, and controls the first to sixth switches Q1 to Q6 to turn on/off on the basis of the detection results (explained later in detail).

Figure 2:
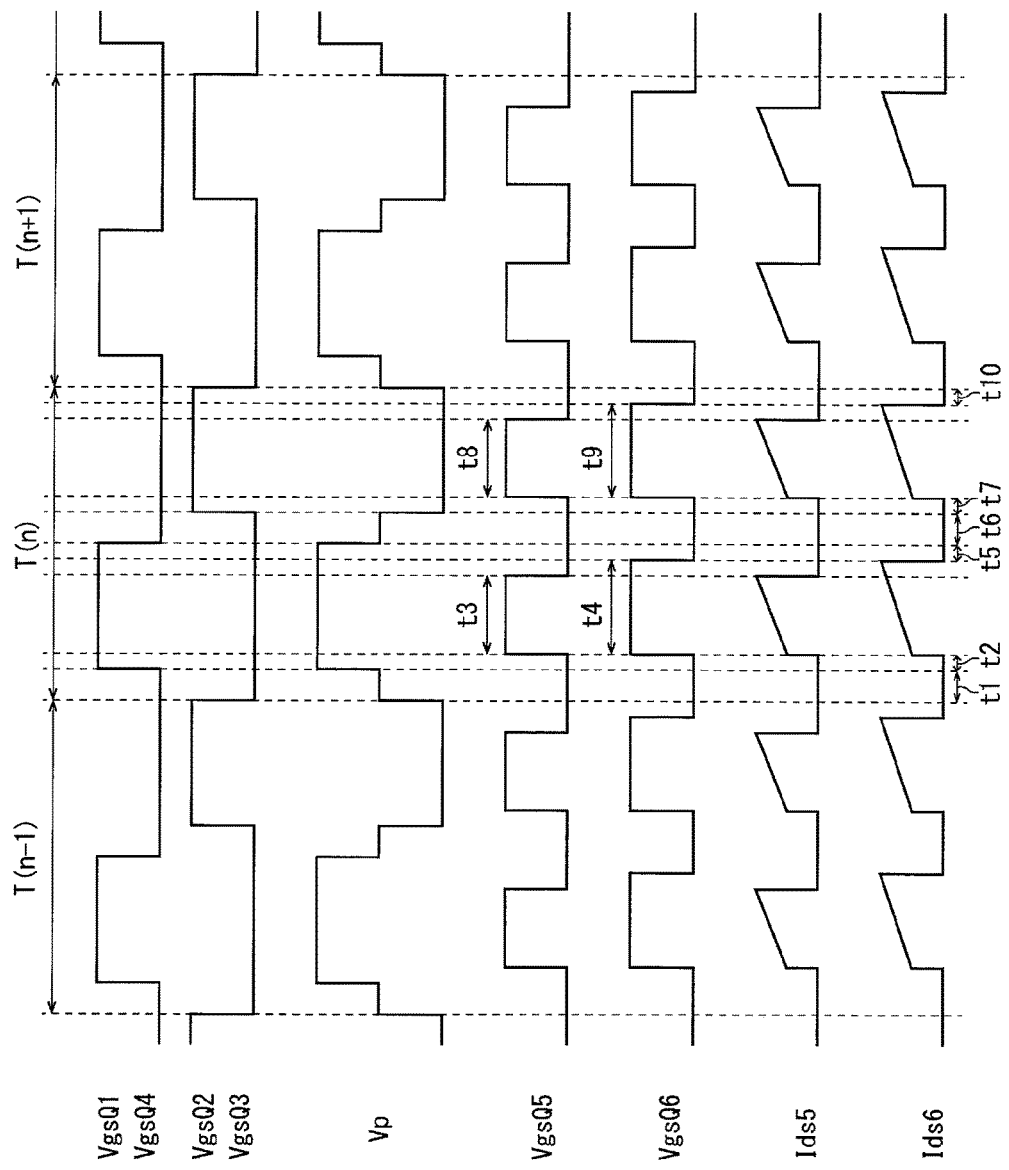
FIG. 2 is a timing chart of a switching power supply device according to the first embodiment of the present disclosure.

Next, usual operations of the switching power supply device 100 will be described with reference to FIG. 2. FIG. 2 is a timing chart showing periodic operations of the switching power supply device 100, where T(n−1) represents an operation at n−1 cycle, T(n) represents an operation at n cycle, and T(n+1) represents an operation at n+1 cycle. In addition, n is an integer of 2 or above, and as shown in FIG. 2, each cycle is composed of periods t1 to t10. Also, in FIG. 2, VgsQ1, VgsQ2, VgsQ3, VgsQ4, VgsQ5 and VgsQ6 respectively represent input waveforms (namely PWM signals) input to gate terminals of the first switch Q1, the second switch Q2, the third switch Q3, the fourth switch Q4, the fifth switch Q5 and the sixth switch Q6, Vp represents a voltage waveform between both terminals of the primary coil Vp, Ids5 represents a current waveform between the drain and the source of the fifth switch Q5, and Ids6 represents a current waveform between the drain and the source of the sixth switch Q6.

In FIG. 2, t1 represents a period when VgsQ1 and VgsQ4 turn off (Low) and VgsQ2 and VgsQ3 turn off (Low). In this period, an electromotive force is not generated at the primary coil Vp of the transformer T, and an electromotive force is also not induced at the secondary coils Vs1, Vs2 and the secondary coils Vs3, Vs4. Therefore, in this period, VgsQ5 and VgsQ6 are also controlled to turn off (Low), the diodes D1, D2, D3 and the diode D4 are not electrically connected, and the diode D5 and the diode D6 are electrically connected. Therefore, in this period, charges are not accumulated in the smoothing condensers C1, C2.

In FIG. 2, t2 represents a period when VgsQ1 and VgsQ4 turn on (High), VgsQ2 and VgsQ3 turn off (Low), and VgsQ5 and VgsQ6 turn off (Low). In this period, a forward electromotive force is generated at the primary coil Vp of the transformer T, and an electromotive force is also induced in a forward direction at the secondary coils Vs1, Vs2 and the secondary coils Vs3, Vs4. However, since VgsQ5 and VgsQ6 turn off, the diodes D1, D2, D3 and the diode D4 are not electrically connected, and the diode D5 and the diode D6 are connected. Therefore, in this period, an induced electromotive force is not generated at the secondary coils Vs1, Vs2 and the secondary coils Vs3, Vs4. As described above, in this embodiment, after VgsQ1 and VgsQ4 turn on, there is a delay as much as t2 till VgsQ5 and VgsQ6 turn on (namely, till t3 and t4), thereby improving a switching loss when the first switch Q1 and the fourth switch Q4 turn on. In other words, when the first switch Q1 and the fourth switch Q4 turn on, since a current does not flow on the secondary coils Vs1, Vs2 and the secondary coils Vs3, Vs4, a current does substantially not flow on the primary coil Vp, and a switching loss is not generated at the first switch Q1 and the fourth switch Q4.

In FIG. 2, t3 represents a period when VgsQ1 and VgsQ4 turn on (High), VgsQ2 and VgsQ3 turn off (Low), and VgsQ5 turns on (High). In this period, a forward electromotive force is generated at the primary coil Vp of the transformer T, and also an electromotive force is induced in a forward direction at the secondary coils Vs1, Vs2. In addition, since VgsQ5 turns on, the diode D2 is electrically connected, and the diodes D1 and D5 are electrically not connected. Therefore, in this period, since a current flows on the secondary coils Vs1, Vs2, the fifth switch Q5, the smoothing inductor L1 and the smoothing condenser C1, an induced electromotive force is generated at the secondary coils Vs1, Vs2, and a voltage is generated at both ends of the smoothing condenser C1. As described above, in this embodiment, an induced electromotive force is generated at the secondary coils Vs1, Vs2 in the periods t3 and t8 (explained later), and this is repeated periodically, so that a predetermined output voltage (Vo1) is generated at both ends of the smoothing condenser C1. In addition, as described later, the period t3 during which VgsQ5 turns on is determined by the micro-computer control unit 60 on the basis of the output voltage Vo1 and the output current IL1. In addition, when VgsQ5 rises (namely, when the fifth switch Q5 turns on), a switching loss is generated at the fifth switch Q5. Here, since the fifth switch Q5 is a faster element in comparison to the first switch Q1 and the fourth switch Q4 as described above, the switching loss of the fifth switch Q5 is smaller than the switching loss generated by the first switch Q1 and the fourth switch Q4. As described above, in this embodiment, the switching loss of the first switch Q1 and the fourth switch Q4 (namely, a switching loss of two slow N-channel MOS-type FETs) is substituted with the switching loss of the fifth switch Q5 (namely, a switching loss of a single fast N-channel MOS-type FET), thereby greatly improving the switching loss.

In FIG. 2, t4 represents a period when VgsQ1 and VgsQ4 turn on (High), VgsQ2 and VgsQ3 turn off (Low), and VgsQ6 turns on (High). In this period, a forward electromotive force is generated at the primary coil Vp of the transformer T, and an electromotive force is also induced in a forward direction at the secondary coils Vs3, Vs4. In addition, since VgsQ6 turns on, the diode D4 is electrically connected, and the diodes D3 and D6 are not electrically connected. Therefore, in this period, since a current flows on the secondary coils Vs3, Vs4, the sixth switch Q6, the smoothing inductor L2 and the smoothing condenser C2, an induced electromotive force is generated at the secondary coils Vs3, Vs4, and a voltage is generated at both ends of the smoothing condenser C2. As described above, in this embodiment, an induced electromotive force is generated at the secondary coils Vs3, Vs4 during the periods t4 and t9 (explained later), and if this is repeated periodically, a predetermined output voltage Vo2 is generated at both ends of the smoothing condenser C2. In addition, as described later, an ON time t4 of VgsQ6 is determined by the micro-computer control unit 60 on the basis of the output voltage Vo2 and the output current IL2. In addition, in FIG. 2, it is depicted that t4 is longer than t3. However, since t3 and t4 are set independently, as described later, t4 may also be shorter than t3. In addition, when VgsQ6 rises (namely, when the sixth switch Q6 turns on), sixth a switching loss is generated at the switch Q6. Here, since the sixth switch Q6 is a faster element in comparison to the first switch Q1 and the fourth switch Q4 as described above, the switching loss of the sixth switch Q6 is smaller than the switching loss generated by the first switch Q1 and the fourth switch Q4. As described above, in this embodiment, a switching loss of the first switch Q1 and the fourth switch Q4 (namely, a switching loss of two slow N-channel MOS-type FETs) is substituted with the switching loss of the sixth switch Q6 (namely, a switching loss of a single fast N-channel MOS-type FET), thereby greatly improving the switching loss.

In FIG. 2, t5 represents a period when VgsQ1 and VgsQ4 turn on (High), VgsQ2 and VgsQ3 turn off (Low), and VgsQ5 and VgsQ6 turn off (Low). In this period, a forward electromotive force is generated at the primary coil Vp of the transformer T, and an electromotive force is also induced in a forward direction at the secondary coils Vs1, Vs2 and the secondary coils Vs3, Vs4. However, since VgsQ5 and VgsQ6 turn off, the diodes D1, D2, D3 and the diode D4 are electrically not connected, and the diode D5 and the diode D6 are electrically connected. Therefore, in this period, an induced electromotive force is not generated at the secondary coils Vs1, Vs2 and the secondary coils Vs3, Vs4. As described above, in this embodiment, after VgsQ5 and VgsQ6 turn off, there is a delay as much as t5 until VgsQ1 and VgsQ4 turn off, thereby improving a switching loss when the first switch Q1 and the fourth switch Q4 turn off. In other words, since a current does not flow on the secondary coils Vs1, Vs2 and the secondary coils Vs3, Vs4 when the first switch Q1 and the fourth switch Q4 turn off, a current does not substantially flow on the primary coil Vp, and a switching loss is not generated at the first switch Q1 and the fourth switch Q4.

In FIG. 2, t6 represents a period when VgsQ1 and VgsQ4 turn off (Low), VgsQ2 and VgsQ3 turn off (Low), and VgsQ5 and VgsQ6 turn off (Low), similar to t1. In this period, an electromotive force is not generated at the primary coil Vp of the transformer T, and an electromotive force is also not induced to the secondary coils Vs1, Vs2 and the secondary coils Vs3, Vs4. In addition, since VgsQ5 and VgsQ6 turn off, the diodes D1, D2, D3 and the diode D4 are not electrically connected, the diode D5 and the diode D6 are electrically connected, and charges are not accumulated in the smoothing condensers C1, C2.

In FIG. 2, t7 represents a period when VgsQ1 and VgsQ4 turn off (Low), VgsQ2 and VgsQ3 turn on (High), and VgsQ5 and VgsQ6 turn off (Low). In this period, a backward electromotive force is generated at the primary coil Vp of the transformer T, and also an electromotive force is induced in a backward direction at the secondary coils Vs1, Vs2 and the secondary coils Vs3, Vs4. However, since VgsQ5 and VgsQ6 turn off, the diodes D1, D2, D3 and the diode D4 are electrically not connected, and the diode D5 and the diode D6 are electrically connected. Therefore, in this period, an induced electromotive force is not generated at the secondary coils Vs1, Vs2 and the secondary coils Vs3, Vs4. As described above, in this embodiment, after VgsQ2 and VgsQ3 turn on, there is a delay as much as t7 until VgsQ5 and VgsQ6 turn on (namely, till t8 and t9), thereby improving a switching loss when the second switch Q2 and the third switch Q3 turn on. In other words, since a current does not flow on the secondary coils Vs1, Vs2 and the secondary coils Vs3, Vs4 when the second switch Q2 and the third switch Q3 turn on, a current does not substantially flow on the primary coil Vp, and a switching loss is not generated at the second switch Q2 and the third switch Q3.

In FIG. 2, t8 represents a period when VgsQ1 and VgsQ4 turn off (Low), VgsQ2 and VgsQ3 turn on (High), and VgsQ5 turns on (High). In this period, a backward electromotive force is generated at the primary coil Vp of the transformer T, and also an electromotive force is induced in a backward direction to the secondary coils Vs1, Vs2. In addition, since VgsQ5 turns on, the diode D1 is electrically connected, and the diodes D2, D5 are electrically not connected. Therefore, in this period, since a current flows on the secondary coils Vs1, Vs2, the fifth switch Q5, the smoothing inductor L1 and the smoothing condenser C1, an induced electromotive force is generated at the secondary coils Vs1, Vs2, and a voltage is generated at both ends of the smoothing condenser C1. As described above, in this embodiment, an induced electromotive force is generated at the secondary coils Vs1, Vs2 in the periods t8 and t3 (described above), and if this is repeated periodically, a predetermined output voltage (Vo1) is generated at both ends of the smoothing condenser C1. In addition, the ON time t8 of VgsQ5 is identical to t3 and is determined by the micro-computer control unit 60 on the basis of the output voltage Vo1 and the output current IL1. In addition, similar to t3, when VgsQ5 rises (namely, when the fifth switch Q5 turns on), a switching loss is generated at the fifth switch Q5. Here, since the fifth switch Q5 is a faster element in comparison to the second switch Q2 and the third switch Q3 as described above, the switching loss of the fifth switch Q5 is smaller than a switching loss generated by the second switch Q2 and the third switch Q3. As described above, in this embodiment, the switching loss of the second switch Q2 and the third switch Q3 (namely, a switching loss of two slow N-channel MOS-type FETs) is substituted with the switching loss of the fifth switch Q5 (namely, a switching loss of a single fast N-channel MOS-type FET), thereby greatly improving the switching loss.

In FIG. 2, t9 represents a period when VgsQ1 and VgsQ4 turn off (Low), VgsQ2 and VgsQ3 turn on (High), and VgsQ6 turns on (High). In this period, a backward electromotive force is generated at the primary coil Vp of the transformer T, and an electromotive force is also induced in a backward direction at the secondary coils Vs3, Vs4. In addition, since VgsQ6 turns on, the diode D3 is electrically connected, and the diodes D4 and D6 are electrically not connected. Therefore, in this period, since a current flows on the secondary coils Vs3, Vs4, the sixth switch Q6, the smoothing inductor L2 and the smoothing condenser C2, an induced electromotive force is generated at the secondary coils Vs3, Vs4, and a voltage is generated at both ends of the smoothing condenser C2. As described above, in this embodiment, an induced electromotive force is generated at the secondary coils Vs3, Vs4 during the periods t9 and t4 (described above), and if this is repeated periodically, a predetermined output voltage Vo2 is generated at both ends of the smoothing condenser C2. In addition, the ON time t9 of VgsQ6 is identical to t4 and is determined by the micro-computer control unit 60 on the basis of the output voltage Vo2 and the output current IL2. In addition, similar to t3 and t4, FIG. 2 depicts that t9 is longer than t8. However, since t8 and t9 are set independently, t9 may also be shorter than t8. In addition, similar to t4, when VgsQ6 rises (namely, when the sixth switch Q6 turns on), a switching loss is generated at the sixth switch Q6. Here, since the sixth switch Q6 is a faster element in comparison to the second switch Q2 and the third switch Q3 as described above, the switching loss of the sixth switch Q6 is smaller than the switching loss generated by the second switch Q2 and the third switch Q3. As described above, in this embodiment, the switching loss of the second switch Q2 and the third switch Q3 (namely, a switching loss of two slow N-channel MOS-type FETs) is substituted with the switching loss of the sixth switch Q6 (namely, a switching loss of a single fast N-channel MOS-type FET), thereby greatly improving the switching loss.

In FIG. 2, t10 represents a period when VgsQ1 and VgsQ4 turn off (Low), VgsQ2 and VgsQ3 turn on (High), and VgsQ5 and VgsQ6 turn off (Low). In this period, a backward electromotive force is generated at the primary coil Vp of the transformer T, and an electromotive force is also induced in a backward direction at the secondary coils Vs1, Vs2 and the secondary coils Vs3, Vs4. However, since VgsQ5 and VgsQ6 turn off, the diodes D1, D2, D3 and the diode D4 are electrically not connected, and the diode D5 and the diode D6 are electrically connected. Therefore, in this period, an induced electromotive force is not generated at the secondary coils Vs1, Vs2 and the secondary coils Vs3, Vs4. As described above, in this embodiment, after VgsQ5 and VgsQ6 turn off, there is a delay as much as t10 until VgsQ2 and VgsQ3 turn off, thereby improving a switching loss when the second switch Q2 and the third switch Q3 turn off. In other words, since a current does not flow on the secondary coils Vs1, Vs2 and the secondary coils Vs3, Vs4 when the second switch Q2 and the third switch Q3 turn off, a current does not substantially flow on the primary coil Vp, and a switching loss is not generated at the second switch Q2 and the third switch Q3.

As described above, in this embodiment, VgsQ5 and VgsQ6 turn on/off during a period when VgsQ1 and VgsQ4 turn on (High) and VgsQ2 and VgsQ3 turn off (Low) and a period when VgsQ1 and VgsQ4 turn off (Low) and VgsQ2 and VgsQ3 turn on (High), and thus a load current is not generated when the first switch Q1, the second switch Q2, the third switch Q3 and the fourth switch Q4 turn on or off. Therefore, when the first switch Q1, the second switch Q2, the third switch Q3 and the fourth switch Q4 turn on or off, a switching loss is not generated.

Figure 3:
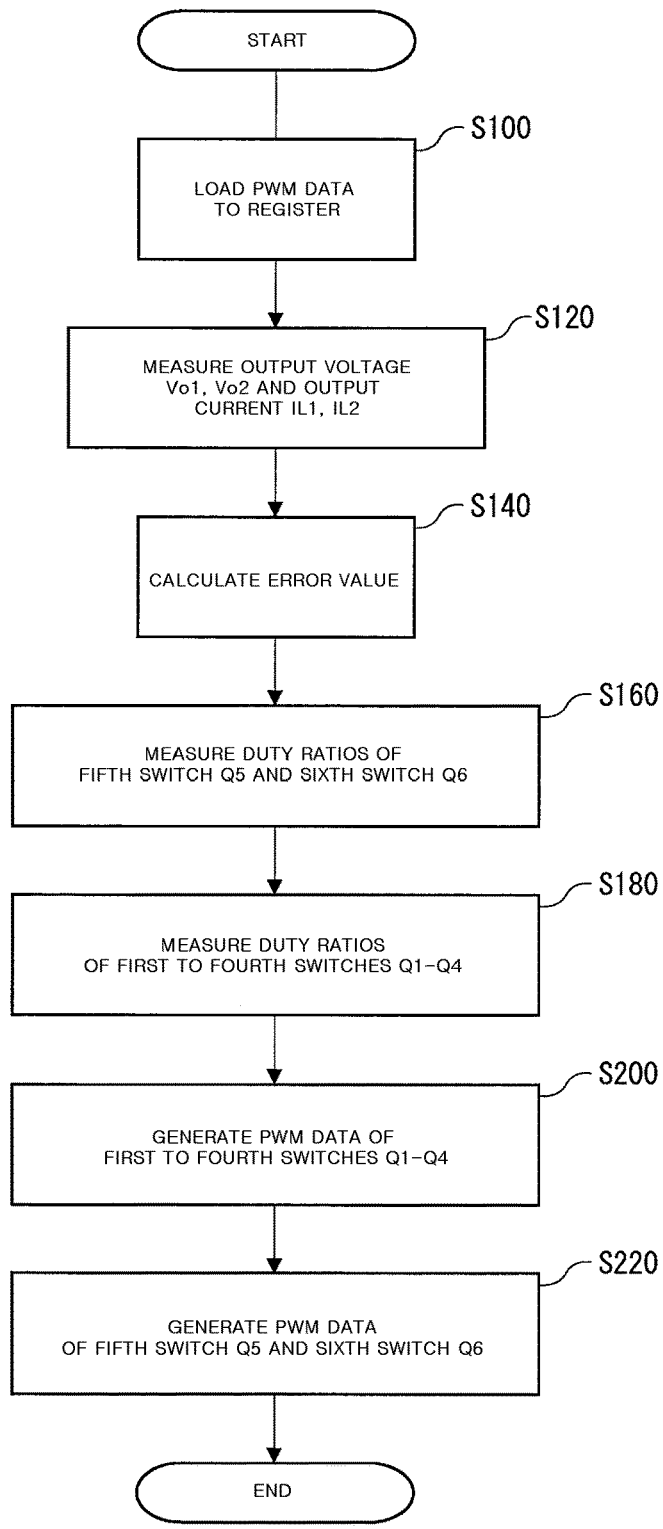
FIG. 3 is a flowchart for illustrating an output voltage adjusting process, executed by a micro-computer control unit of the switching power supply device according to the first embodiment of the present disclosure.

Next, an output voltage adjusting process (program) executed by the micro-computer control unit 60 of the switching power supply device 100 will be described, and also usual operations of the switching power supply device 100 will be described in more detail. FIG. 3 is a flowchart for illustrating the output voltage adjusting process executed by the micro-computer control unit 60 of the switching power supply device 100, which represents a process executed at every cycle in FIG. 2. In addition, since the output voltage adjusting process is repeatedly executed at every cycle, the following detailed description will be focused on T(n) (namely, $n^{th}$ cycle) of FIG. 2.

As shown in FIG. 3, if the output voltage adjusting process starts, the micro-computer control unit 60 firstly executes Step S100. In Step S100, the micro-computer control unit 60 loads each set value (namely, PWM data of each waveform of VgsQ1, VgsQ2, VgsQ3, VgsQ4, VgsQ5 and VgsQ6), obtained in an output voltage adjusting process at T(n−1) cycle, which is a just previous cycle, to a register (not shown) in the micro-computer control unit 60. The hardware of the micro-computer control unit 60 is configured to output each waveform (namely, PWM signal) of VgsQ1, VgsQ2, VgsQ3, VgsQ4, VgsQ5 and VgsQ6 according to the corresponding PWM data, if the PWM data of each waveform of VgsQ1, VgsQ2, VgsQ3, VgsQ4, VgsQ5 and VgsQ6 is loaded to the register, and the first to sixth switches Q1 to Q6 are controlled to turn on/off. In detail, as shown in FIG. 2, the first switch Q1 and the fourth switch Q4 turn on/off by means of a predetermined PWM signal (FIG. 2: VgsQ1, VgsQ4), and the second switch Q2 and the third switch Q3 turn on/off by means of a predetermined PWM signal (FIG. 2: VgsQ2, VgsQ3). In addition, the micro-computer control unit 60 turns on the fifth switch Q5 and the sixth switch Q6 after the time t2 from a rising edge of the first switch Q1 and the fourth switch Q4, turns on the fifth switch Q5 after the time t3 from the point of turning on the fifth switch Q5, and turns off the sixth switch Q6 after the time t4 from the point of turning on the sixth switch Q6 (FIG. 2: VgsQ5, VgsQ6). In addition, after the sixth switch Q6 turns off, the time t5 is prepared till a falling edge of the first switch Q1 and the fourth switch Q4. In addition, the micro-computer control unit 60 turns on the fifth switch Q5 and the sixth switch Q6 after the time t7 from a rising edge of the second switch Q2 and the third switch Q3, turns off the fifth switch Q5 after the time t8 from the point of turning on the fifth switch Q5, and turns off the sixth switch Q6 after the time t9 from the point of turning on the sixth switch Q6 (FIG. 2: VgsQ5, VgsQ6). In addition, after the sixth switch Q6 turns off, the time t10 is prepared till a falling edge of the second switch Q2 and the third switch Q3.

As described above, in this embodiment, the fifth switch Q5 and the sixth switch Q6 turn on/off during a period when the first switch Q1 and the fourth switch Q4 turn on and during a period when the second switch Q2 and the third switch Q3 turn on, and a forward current flows at the primary coil Vp of the transformer T, and when an electromotive force is securely induced to the secondary coils Vs1, Vs2 and the secondary coils Vs3, Vs4, the fifth switch Q5 and the sixth switch Q6 turn on/off. In other words, when the first switch Q1, the second switch Q2, the third switch Q3 and the fourth switch Q4 turn on/off, the fifth switch Q5 and the sixth switch Q6 turn off, and thus a switching loss is not generated at the first switch Q1, the second switch Q2, the third switch Q3 and the fourth switch Q4. If Step S100 ends (namely, if PWM data of each waveform is loaded to the register), the process proceeds to Step S120.

In Step S120, the micro-computer control unit 60 conducts analog-to-digital (AD) conversion by using an AD converter included therein, with respect to an output voltage Vo1 and an output current IL1 (namely, a voltage of one end of the resistor R1) input from the rectifying and smoothing circuit 40 after a predetermined time from a rising of VgsQ1 and an output voltage Vo2 and an output current IL2 (namely, a voltage of one end of the resistor R2) input from the rectifying and smoothing circuit 50, and measures each voltage and each current. If Step S120 ends, the process proceeds to Step S140.

In Step S140, the micro-computer control unit 60 obtains a difference from a preset target value (namely, an ERROR value), with respect to the output voltage Vo1, the output current IL1, the output voltage Vo2 and the output current IL2, measured in Step S120. If Step S140 ends, the process proceeds to Step S160.

In Step S160, the micro-computer control unit 60 obtains a duty ratio of the fifth switch Q5 (namely, ON time t3 and t8 of the fifth switch Q5), on the basis of the ERROR value of the output voltage Vo1 and the ERROR value of the output current IL1, obtained in Step S140. In more detail, the switching power supply device 100 of this embodiment is configured to operate in a constant-voltage power mode in which the output voltage Vo1 is constant and in a constant-current power mode in which the output current IL1 is constant. In constant-voltage power mode, a duty ratio of the fifth switch Q5 (namely, ON time t3 and t8 of the fifth switch Q5) required for making the ERROR value of the output voltage Vo1 into zero (namely, required for making the output voltage Vo1 equal to a target value) is obtained. In addition, in the constant-current power mode, a duty ratio of the fifth switch Q5 (namely, ON time t3 and t8 of the fifth switch Q5) required for making the ERROR value of the output current IL1 into zero (namely, required for making the output current IL1 identical to a target value) is obtained.

Also, similarly, the micro-computer control unit 60 obtains a duty ratio of the sixth switch Q6 (namely, ON time t4 and t9 of the sixth switch Q6), on the basis of the ERROR value of the output voltage Vo2 and the ERROR value of the output current IL2, obtained in Step S140. In more detail, the switching power supply device 100 of this this embodiment is configured to operate in a constant-voltage power mode in which the output voltage Vo2 is constant and in a constant-current power mode in which the output current IL2 is constant. In the constant-voltage power mode, a duty ratio of the sixth switch Q6 (namely, ON time t4 and t9 of the sixth switch Q6) required for making the ERROR value of the output voltage Vo2 into zero (namely, required for making the output voltage Vo2 equal to a target value) is obtained. In addition, in the constant-current power mode, a duty ratio of the sixth switch Q6 (namely, ON time t4 and t9 of the sixth switch Q6) required for making the ERROR value of the output current IL2 into zero (namely, required for making the output current IL2 equal to a target value) is obtained. If Step S160 ends, the process proceeds to Step S180.

In Step S180, the micro-computer control unit 60 obtains a duty ratio of the first to fourth switches Q1 to Q4, on the basis of the duty ratio of the fifth switch Q5 and the duty ratio of the sixth switch Q6, obtained in Step S160. In detail, the duty ratios of the first switch Q1 and the fourth switch Q4 are set so that the ON time of the fifth switch Q5 and the ON time of the sixth switch Q6 are included in the ON time of the first switch Q1 and the fourth switch Q4 (namely, t2+t4+t5), and the duty ratios of the second switch Q2 and the third switch Q3 are set accordingly (namely, by reversing the same). As described above, in this embodiment, a controlled variable of the primary circuit (namely, ON time of the first to fourth switches Q1 to Q4) is set on the basis of a controlled variable of a secondary circuit (namely, ON time of the fifth switch Q5 and ON time of the sixth switch Q6), so that the ON time of the first to fourth switches Q1 to Q4 becomes as minimal as required, thereby suppressing excitation power and preventing unnecessary power consumption. In addition, when the duty ratios of the first to fourth switches Q1 to Q4 are set, it is desirable to consider an operation delay time of the primary coil Vp and an operation delay time of the first to fourth switches Q1 to Q4. If Step S180 ends, the process proceeds to Step S200.

In Step S200, the micro-computer control unit 60 calculates a parameter required for generating each waveform (VgsQ1, VgsQ2, VgsQ3, VgsQ4) output to the gate terminals of the first to fourth switches Q1 to Q4, on the basis of the duty ratios of the first to fourth switches Q1 to Q4, obtained in Step S180. In more detail, the micro-computer control unit 60 calculates a timing for turning on/off (High/Low) each waveform of VgsQ1, VgsQ2, VgsQ3 and VgsQ4 on the basis of a reference clock and stores the timing in an internal memory as PWM data. In addition, when calculating an on/off timing (namely, PWM data) of each waveform of VgsQ1, VgsQ2, VgsQ3, VgsQ4, TURN-ON time, TURN-OFF time, rising time, falling time or the like of the first to fourth switches Q1 to Q4 are considered. If Step S200 ends, the process proceeds to Step S220.

In Step S220, the micro-computer control unit 60 calculates a parameter required for generating each waveform (VgsQ5, VgsQ6) output to the gate terminals of the fifth switch Q5 and the sixth switch Q6, on the basis of the duty ratio of the fifth switch Q5 and the duty ratio of the sixth switch Q6, obtained in Step S160. In more detail, the micro-computer control unit 60 calculates a timing for turning on/off (High/Low) each waveform of VgsQ5, VgsQ6 on the basis of a reference clock and stores the timing in an internal memory as PWM data. In addition, when calculating the on/off timing (namely, PWM data) of each waveform of VgsQ5, VgsQ6, TURN-ON time, TURN-OFF time, rising time, falling time or the like of the fifth switch Q5 and the sixth switch Q6 are considered. If Step S220 ends, the output voltage adjusting process ends.

As described above, by executing the output voltage adjusting process repeatedly on a constant cycle, the first to sixth switches Q1 to Q6 are controlled to turn on or off (namely, feedback-controlled) so that the output voltage Vo1 (or, the output current IL1) and the output voltage Vo2 (or, the output current 1L2) are equal to target values. Therefore, the output voltage Vo1 (or, the output current IL1) and the output voltage Vo2 (or, the output current 1L2) output from the switching power supply device 100 of this embodiment have very high precision and stability. In addition, in this embodiment, it is possible to supply high power since a full-bridge circuit is adopted as a primary circuit.

The embodiment of the present disclosure has been described, and the present disclosure is not limited to the above embodiment but may be modified in various ways within the scope thereof.

For example, in this embodiment, the micro-computer control unit 60 is used for turning on/off the first to sixth switches Q1 to Q6, but the present disclosure is not limited thereto, and a gate circuit, a delay circuit or the like known in the art may also be used in combination with the micro-computer control unit 60.

In addition, the first to sixth switches Q1 to Q6 of this embodiment are N-channel MOS-type FETs, but the present disclosure is not limited thereto, and other switching elements such as an analog switch may also be used.

In addition, even though it has been illustrated that the switching power supply device 100 of this embodiment includes two rectifying and smoothing circuits 40, 50 and supplies power to two loads LD1, LD2, but the present disclosure is not limited thereto, and the switching power supply device 100 may include an N (N is an integer of 1 or above) of rectifying and smoothing circuits and supply power to an N number of loads, by changing the number of secondary coils.

In addition, in this embodiment, the switching power supply device 100 is configured to operate in a constant-voltage power mode in which the output voltages Vo1, Vo2 are constant and in a constant-current power mode in which the output currents IL1, 1L2 are constant, but for example, the switching power supply device 100 may also be configured to operate in a constant-voltage constant-current mode in which both modes as above are present together. In this case, the micro-computer control unit 60 may be configured to obtain a duty ratio of the fifth switch Q5 on the basis of a great one of the ERROR value of the output voltage Vo1 and the ERROR value of the output current IL1 and also obtain a duty ratio of the sixth switch Q6 on the basis of a great one of the ERROR value of the output voltage Vo2 and the ERROR value of the output current 1L2. In addition, in the constant-voltage power mode, it is not essential to detect the output currents IL1, 1L2, and also in the constant-current power mode, it is not essential to detect the output voltages Vo1, Vo2.

In addition, even though it has been illustrated that the switching power supply device 100 of this embodiment is loaded on an ultraviolet irradiator to supply power to a LED module or the like, the use of the present disclosure is not limited thereto.

Second Embodiment

Figure 4:
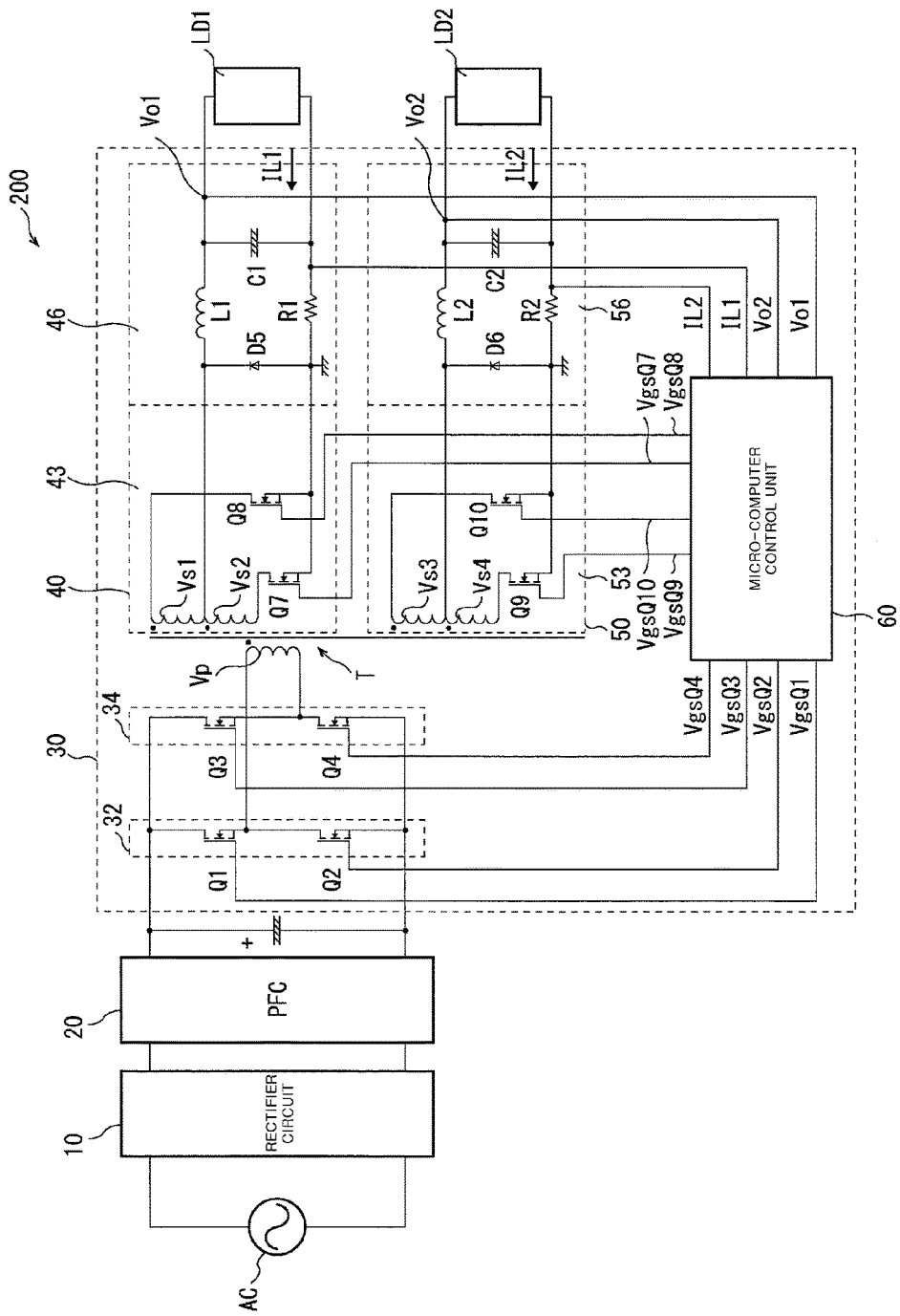
FIG. 4 is a circuit diagram showing a switching power supply device according to the second embodiment of the present disclosure.
Figure 5:
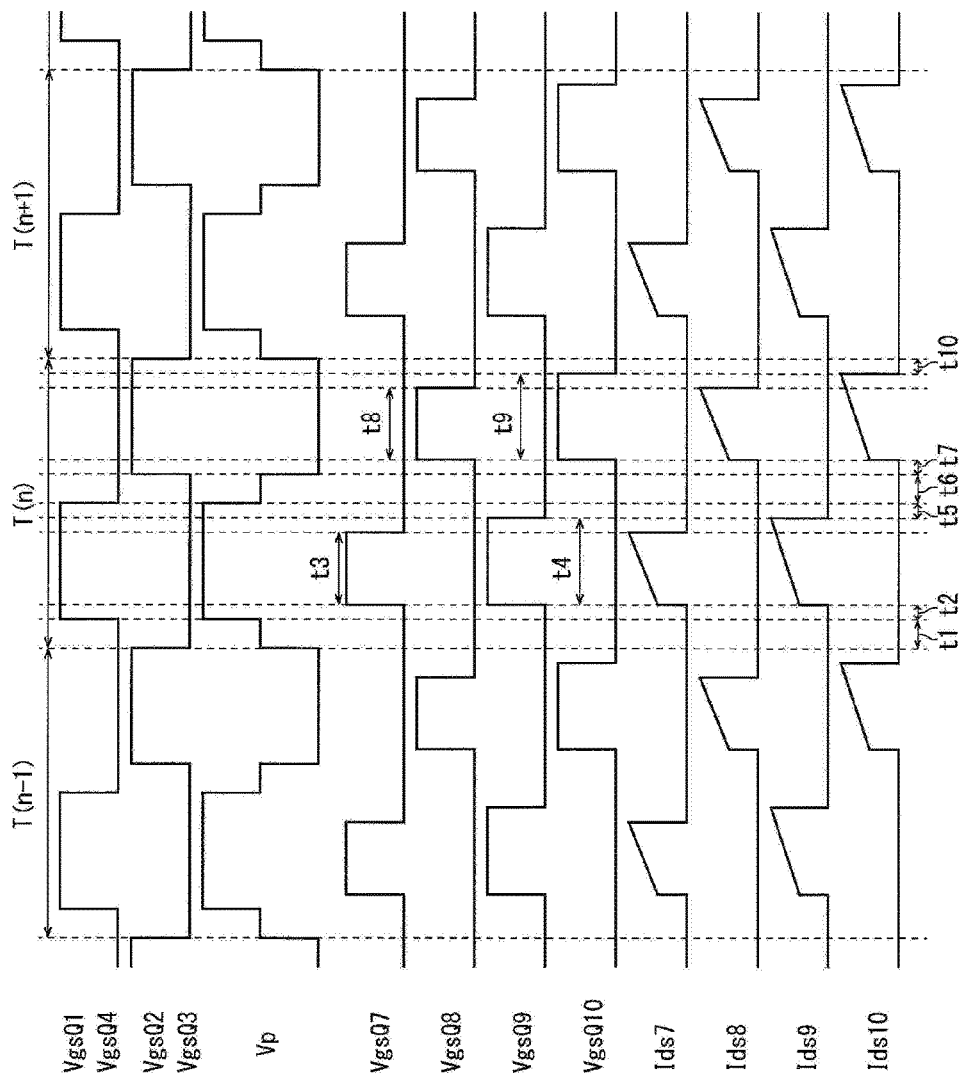
FIG. 5 is a timing chart of a switching power supply device according to the second embodiment of the present disclosure.

FIG. 4 is a circuit diagram schematically showing a switching power supply device 200 according to the second embodiment of the present disclosure. In addition, FIG. 5 is a timing chart of the switching power supply device 200 according to the second embodiment of the present disclosure. As shown in FIG. 4, the switching power supply device 200 of this embodiment includes a seventh switch Q7 and an eighth switch Q8 instead of the diodes D1, D2 and the fifth switch Q5, includes a ninth switch Q9 and a tenth switch Q10 instead of the diodes D3, D4 and the sixth switch Q6, and controls the seventh switch Q7, the eighth switch Q8, the ninth switch Q9 and the tenth switch Q10 according to the above output voltage adjusting process, different from the switching power supply device 100 of the first embodiment. Hereinafter, features of this embodiment, different from the switching power supply device 100 of the first embodiment, will be described in detail. In addition, in FIG. 5, VgsQ7, VgsQ8, VgsQ9, VgsQ10 are respectively input waveforms (namely, PWM signals) input to gate terminals of the seventh switch Q7, the eighth switch Q8, the ninth switch Q9 and the tenth switch Q10, Vp is a voltage waveform of both terminals of the primary coil Vp, and Ids7, Ids8, Ids9 and Ids10 are respectively drain-source current waveforms of the seventh switch Q7, the eighth switch Q8, the ninth switch Q9 and the tenth switch Q10.

A rectifying and smoothing circuit 40 including a rectifying and switching unit 43 for rectifying and switching an AC voltage generated at the secondary coils Vs1, Vs2 and a smoothing unit 46 for smoothing a voltage input from the rectifying and switching unit 43 is connected to the secondary coils Vs1, Vs2 of this this embodiment. The rectifying and switching unit 43 is composed of the seventh switch Q7 and the eighth switch Q8 and serves as the rectifying unit 42 and the switching unit 44 of the first embodiment.

The seventh switch Q7 and the eighth switch Q8 are N-channel MOS-type FETs (secondary switching elements) having no body diode and are circuits for switching an input to the smoothing unit 46. A drain terminal of the eighth switch Q8 is connected to a positive electrode of the secondary coil Vs1, a drain terminal of the seventh switch Q7 is connected to a negative electrode of the secondary coil Vs2, and center points of the secondary coil Vs1 and the secondary coil Vs2 are connected to a cathode terminal of the diode D5 and an input terminal of the smoothing inductor L1. In addition, PWM signals (VgsQ7, VgsQ8) from the micro-computer control unit 60 are input to the gate terminals of the seventh switch Q7 and the eighth switch Q8, and the seventh switch Q7 and the eighth switch Q8 are configured to turn on during a period when a voltage is generated at the secondary coils Vs1, Vs2. In detail, as shown in FIG. 5, the seventh switch Q7 of this embodiment turn on (High) during the period t3, the eighth switch Q8 turn on (High) during the period t8, an induced electromotive force is generated at the secondary coils Vs1, Vs2 during the periods t3 and t8, similar to the first embodiment, and this process is repeated periodically, so that a predetermined output voltage (Vo1) is generated at both ends of the smoothing condenser C1.

In addition, a rectifying and smoothing circuit 50 including a rectifying and switching unit 53 for rectifying and switching an AC voltage generated at the secondary coils Vs3, Vs4 and a smoothing unit 56 for smoothing a voltage input from the rectifying and switching unit 53 are connected to the secondary coils Vs3, Vs4 of this embodiment. The rectifying and switching unit 53 is composed of the ninth switch Q9 and the tenth switch Q10 and serves as the rectifying unit 52 and the switching unit 54 of the first embodiment.

The ninth switch Q9 and the tenth switch Q10 are N-channel MOS-type FETs (secondary switching elements) having no body diode, similar to the seventh switch Q7 and the eighth switch Q8, and are circuits for switching an input to the smoothing unit 56. A drain terminal of the tenth switch Q10 is connected to a positive electrode of the secondary coil Vs3, a drain terminal of the ninth switch Q9 is connected to a negative electrode of the secondary coil Vs4, and center points of the secondary coil Vs3 and the secondary coil Vs4 are connected to a cathode terminal of the diode D6 and an input terminal of the smoothing inductor L2. In addition, PWM signals (VgsQ9, VgsQ10) from the micro-computer control unit 60 are input to the gate terminals of the ninth switch Q9 and the tenth switch Q10, and the ninth switch Q9 and the tenth switch Q10 are configured to turn on during a predetermined time in the period when a voltage is generated at the secondary coils Vs3, Vs4. In detail, as shown in FIG. 5, the ninth switch Q9 of this embodiment turns on (High) in the period t4, the tenth switch Q10 turns on (High) in the period t9, an induced electromotive force is generated at the secondary coils Vs3, Vs4 in the periods t4 and t9, similar to the first embodiment, and this process is repeated periodically, so that a predetermined output voltage Vo2 is generated at both ends of the smoothing condenser C2.

In this embodiment, when the first switch Q1, the second switch Q2, the third switch Q3 and the fourth switch Q4 turn on or off, a current does not flow on the secondary coils Vs3, Vs4, similar to the first embodiment, and thus a current does not substantially flow on the primary coil Vp, and a switching loss is not generated at the first switch Q1, the second switch Q2, the third switch Q3 and the fourth switch Q4.

The embodiment disclosed above should be understood as just illustrating in all aspects, without any limitation. The scope of the present disclosure is defined not by the above description but by the appended claims, and the present disclosure is intended to encompass all equivalents and modifications within the scope of the claims.

REFERENCE SYMBOLS

10 . . . rectifier circuit
20 . . . PFC circuit
30 . . . DC-DC converter
32 . . . first arm
34 . . . second arm
40, 50 . . . rectifying and smoothing circuit
42, 52 . . . rectifying unit
43, 53 . . . rectifying and switching unit
44, 54 . . . switching unit
46, 56 . . . smoothing unit
60 . . . micro-computer control unit
100 . . . switching power supply device
Q1 . . . first switch
Q2 . . . second switch
Q3 . . . third switch
Q4 . . . fourth switch
Q5 . . . fifth switch
Q6 . . . sixth switch
Q7 . . . seventh switch
Q8 . . . eighth switch
Q9 . . . ninth switch
Q10 . . . tenth switch
LD1, LD2 . . . load
T . . . transformer
Vp . . . primary coil
Vs1, Vs2, Vs3, Vs4 . . . secondary coil
D1, D2, D3, D4, D5, D6 . . . diode
L1, L2 . . . smoothing inductor
C1, C2 . . . smoothing condenser
R1, R2 . . . resistor
AC . . . AC power source

The invention claimed is:
1. A switching power supply device, comprising:
a rectifier circuit configured to rectify a commercial AC voltage to be converted into a DC voltage;
a full-bridge circuit including a first arm composed of a first switching element and a second switching element connected in series with respect to the DC voltage and a second arm composed of a third switching element and a fourth switching element connected in series with respect to the DC voltage;
a transformer having a single primary coil and an N number of secondary coils, where N is an integer of 1 or above, the primary coil having one end connected to a node between the first switching element and the second switching element of the first arm, the primary coil having the other end connected to a node between the third switching element and the fourth switching element of the second arm;

an N number of rectifying and smoothing circuits, each rectifying and smoothing circuit comprising:
 a rectifying unit connected to each of the secondary coils to rectify an AC voltage generated at the secondary coil,
 a secondary switching element configured to control an output of the rectified voltage rectified by the rectifying unit, the secondary switching element having one terminal connected to one of the secondary coils and another terminal connected to a secondary ground, and
 a smoothing unit configured to smooth the rectified voltage to generate a DC output voltage and supply power to a load;

an output detecting circuit configured to detect at least one of voltage and current output from the smoothing unit of each of the rectifying and smoothing circuits; and a control circuit configured to control the first to fourth switching elements and the secondary switching element to turn on/off on the basis of at least one of the detected voltage and the detected current detected by the output detecting circuit, wherein the control circuit turns on each of the secondary switching elements such that, in each duty cycle of the secondary switching elements, the control circuit turns on each of the secondary switching elements at a first predetermined time after turning on the first switching element and the fourth switching element, and the control circuit turns off each of the secondary switching elements at a second predetermined time prior to turning off each of the first switching element and the fourth switching element, the control circuit turns on each of the secondary switching elements such that, in each duty cycle of the secondary switching elements, the control circuit turns on each of the secondary switching elements at a third predetermined time after turning on the second switching element and the third switching element, and the control circuit turns off each of the secondary switching elements at a fourth predetermined time prior to turning off the second switching element and the third switching element, and the control circuit turns on each of the secondary switching elements so that, in each duty cycle of the secondary switching elements, the voltage or current output from the smoothing unit of each of the rectifying and smoothing circuits becomes a preset target voltage or target current during a period when the first switching element and the fourth switching element turn on and during a period when the second switching element and the third switching element turn on.

2. The switching power supply device according to claim 1,
 wherein the control circuit obtains at least one of a voltage difference between the target voltage and the detected voltage and a current difference between the target current and the detected current, and controls the first to fourth switching elements and the secondary switching element to turn on/off on the basis of at least one of the voltage difference and the current difference.

3. The switching power supply device according to claim 2,
 wherein the control circuit determines an on/off timing of the secondary switching element on the basis of at least one of the voltage difference and the current difference, and determines an on/off timing of the first to fourth switching elements on the basis of the on/off timing of the secondary switching element.

4. The switching power supply device according to claim 1,
 wherein each of the rectifying units includes a first diode having a cathode terminal connected to one end of each of the secondary coils, and a second diode having a cathode terminal connected to the other end of each of the secondary coils, and
 wherein an anode terminal of the first diode and an anode terminal of the second diode are connected to the secondary ground.

5. The switching power supply device according to claim 2,
 wherein each of the rectifying units includes a first diode having a cathode terminal connected to one end of each of the secondary coils, and a second diode having a cathode terminal connected to the other end of each of the secondary coils, and
 wherein an anode terminal of the first diode and an anode terminal of the second diode are connected to the secondary ground.

6. A switching power supply device, comprising:
 a rectifier circuit configured to rectify a commercial AC voltage to be converted into a DC voltage;
 a full-bridge circuit including a first arm composed of a first switching element and a second switching element connected in series with respect to the DC voltage and a second arm composed of a third switching element and a fourth switching element connected in series with respect to the DC voltage;
 a transformer having a single primary coil and an N number of secondary coils, where N is an integer of 1 or above, the primary coil having one end connected to a node between the first switching element and the second switching element of the first arm, the primary coil having the other end connected to a node between the third switching element and the fourth switching element of the second arm;
 an N number of rectifying and smoothing circuits, each rectifying and smoothing circuit comprising:
  a rectifying and switching unit connected to each of the secondary coils to rectify an AC voltage generated at the secondary coil and to control an output of a rectified voltage, the rectifying and switching unit having one terminal connected to one of the secondary coils and another terminal connected to a secondary ground, and
  a smoothing unit configured to smooth the rectified voltage to generate a DC output voltage and supply power to a load;
 an output detecting circuit configured to detect at least one of voltage and current output from the smoothing unit of each of the rectifying and smoothing circuits; and
 a control circuit configured to control the first to fourth switching elements and the rectifying and switching unit to turn on/off on the basis of at least one of the detected voltage and the detected current detected by the output detecting circuit,
 wherein the control circuit turns on rectifying and switching elements in each of the rectifying and switching units such that, in each duty cycle of the respective rectifying and switching units, the control circuit turns on at least one rectifying and switching element at a first predetermined time after turning on the first switching element and the fourth switching element, and the control circuit turns off the at least one rectifying and switching element at a second predetermined time prior to turning off each of the first switching element and the fourth switching element, the control circuit turns on the at least one rectifying and switching element such that, in each duty cycle of the respective rectifying and switching units, the control circuit turns on at least another of the rectifying and switching elements at a third predetermined time after turning on the second switching element and the third switching element, and the control circuit turns off the at least another rectifying and switching element at a fourth predetermined time prior to turning off the second switching element and the third switching element, and the control circuit turns on each of the rectifying and switching units so that, in each duty cycle of the rectifying and switching units, the voltage or current output from the smoothing unit of each of the rectifying and smoothing circuits becomes a preset target voltage or target current during a period when the first switching element and the fourth switching element turn on and during a period when the second switching element and the third switching element turn on, wherein each of the rectifying and switching units includes a first MOS-type FET having a drain connected to one end of each of the secondary coils, and a second MOS-type FET having a drain connected to the other end of each of the secondary coils, wherein a source terminal of the first MOS-type FET and a source terminal of the second MOS-type FET are connected to the secondary ground, wherein a gate terminal of the first MOS-type FET and a gate terminal of the second MOS-type FET are respectively connected to the control circuit, and wherein the first MOS-type FET and the second MOS-type FET rectify an AC voltage generated at the secondary coil.

7. The switching power supply device according to claim 4, wherein each of the secondary coils is composed of a first coil and a second coil connected in series, and wherein the rectifying unit outputs voltages of center points of the first coil and the second coil as the rectified voltage.

8. The switching power supply device according to claim 5, wherein each of the secondary coils is composed of a first coil and a second coil connected in series, and wherein the rectifying unit outputs voltages of center points of the first coil and the second coil as the rectified voltage.

9. The switching power supply device according to claim 6, wherein each of the secondary coils is composed of a first coil and a second coil connected in series, and wherein the rectifying and switching unit outputs voltages of center points of the first coil and the second coil as the rectified voltage.

10. A light illuminating apparatus, comprising:
a switching power supply device defined in claim 1; and
an N number of LED modules connected to each of the rectifying and smoothing circuits to emit light.

11. A light illuminating apparatus, comprising:
a switching power supply device defined in claim 2; and
an N number of LED modules connected to each of the rectifying and smoothing circuits to emit light.

12. The switching power supply device of claim 1, wherein the smoothing unit comprises an inductor connected in parallel with a resistor, and
an output terminal of the secondary switching element is electrically connected to a terminal of the inductor so as to selectively provide current to the terminal of the inductor.

13. The switching power supply device of claim 1, wherein the secondary switching element is a semiconductor switching element connected in series between a center of a respective secondary coil and a respective smoothing unit to selectively provide current to the respective smoothing unit based on a control signal from the control unit.

14. The switching power supply device of claim 1, wherein the control circuit is configured to detect at least one of an output voltage and an output current, calculate at least one of a difference between the output voltage and the target voltage and a difference between the output current and the target current, calculate a duty ratio of the secondary switching element based on at least one of the calculated difference between the output voltage and the target voltage and the output current and the target current, and calculate a duty ratio of the first to fourth switching elements based on the calculated duty ratio of the secondary switching element.

\* \* \* \* \*